United States Patent [19]

Hirtle et al.

[11] 4,380,065
[45] Apr. 12, 1983

[54] COMMUNICATION MULTIPLEXER VARIABLE PRIORITY SCHEME

[75] Inventors: Allen C. Hirtle; Gary J. Goss, both of Acton, Mass.

[73] Assignee: Honeywell Information Systems Inc., Waltham, Mass.

[21] Appl. No.: 191,629

[22] Filed: Sep. 29, 1980

[51] Int. Cl.³ .............................................. H04J 3/02
[52] U.S. Cl. ..................................... 370/96; 370/85; 340/825.5
[58] Field of Search ........................... 370/96, 95, 85; 364/200, 900; 340/825.5, 825.51, 825.54

[56] References Cited

U.S. PATENT DOCUMENTS

| 3,702,008 | 10/1972 | Groth | 370/96 |
| 4,100,533 | 7/1978 | Napolitano et al. | 370/96 |
| 4,149,144 | 4/1979 | Diefenderfer | 370/85 |
| 4,195,343 | 5/1980 | Joyce | 364/200 |

Primary Examiner—Douglas W. Olms
Attorney, Agent, or Firm—George Grayson; Nicholas Prasinos

[57] ABSTRACT

A communication multiplexer stores the receive and transmit channel numbers of input/output devices coupled to the multiplexer by communication lines in a first-in-first out (FIFO) memory. The input/output devices are polled by sending the channel numbers from the FIFO to the input/output devices. An input/output device requesting service responds to its channel number. The remaining channel numbers in the FIFO are recirculated to give the receive channel numbers priority over the transmit channel numbers. This gives high priority to a most recently used receive channel operative in a burst mode and equal priority to all transmit channels.

8 Claims, 6 Drawing Figures

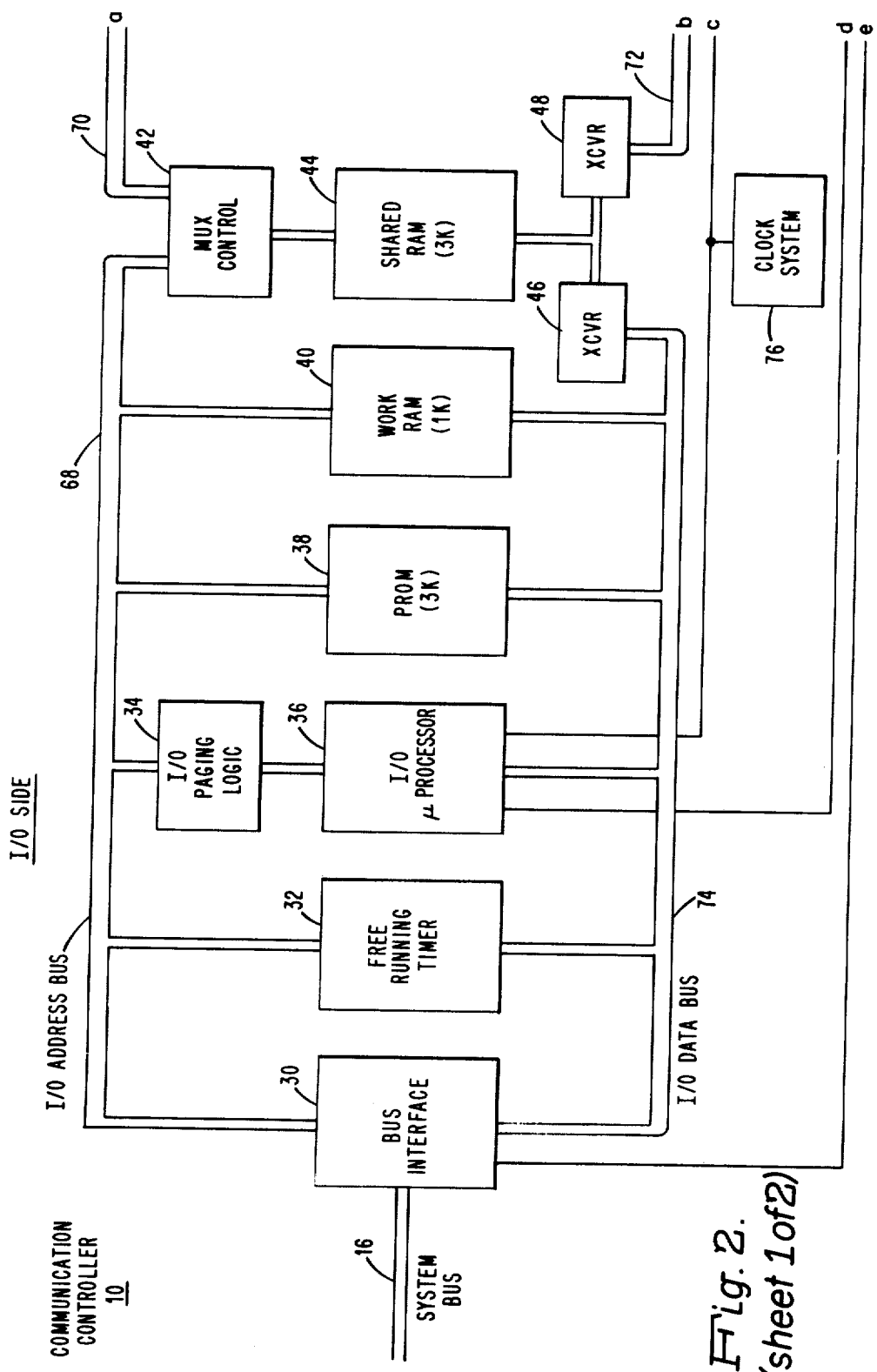
Fig. 2. (sheet 1 of 2)

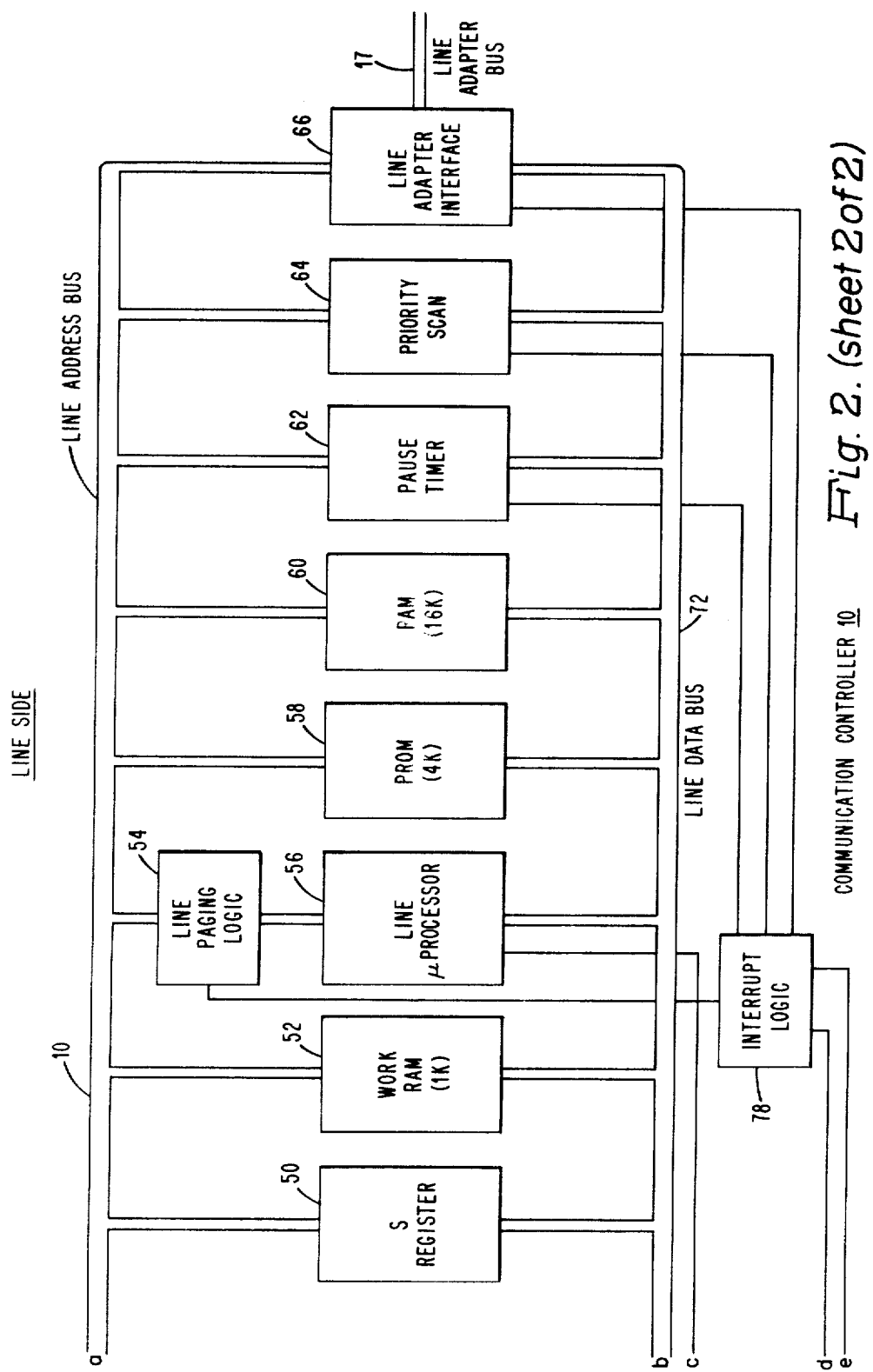

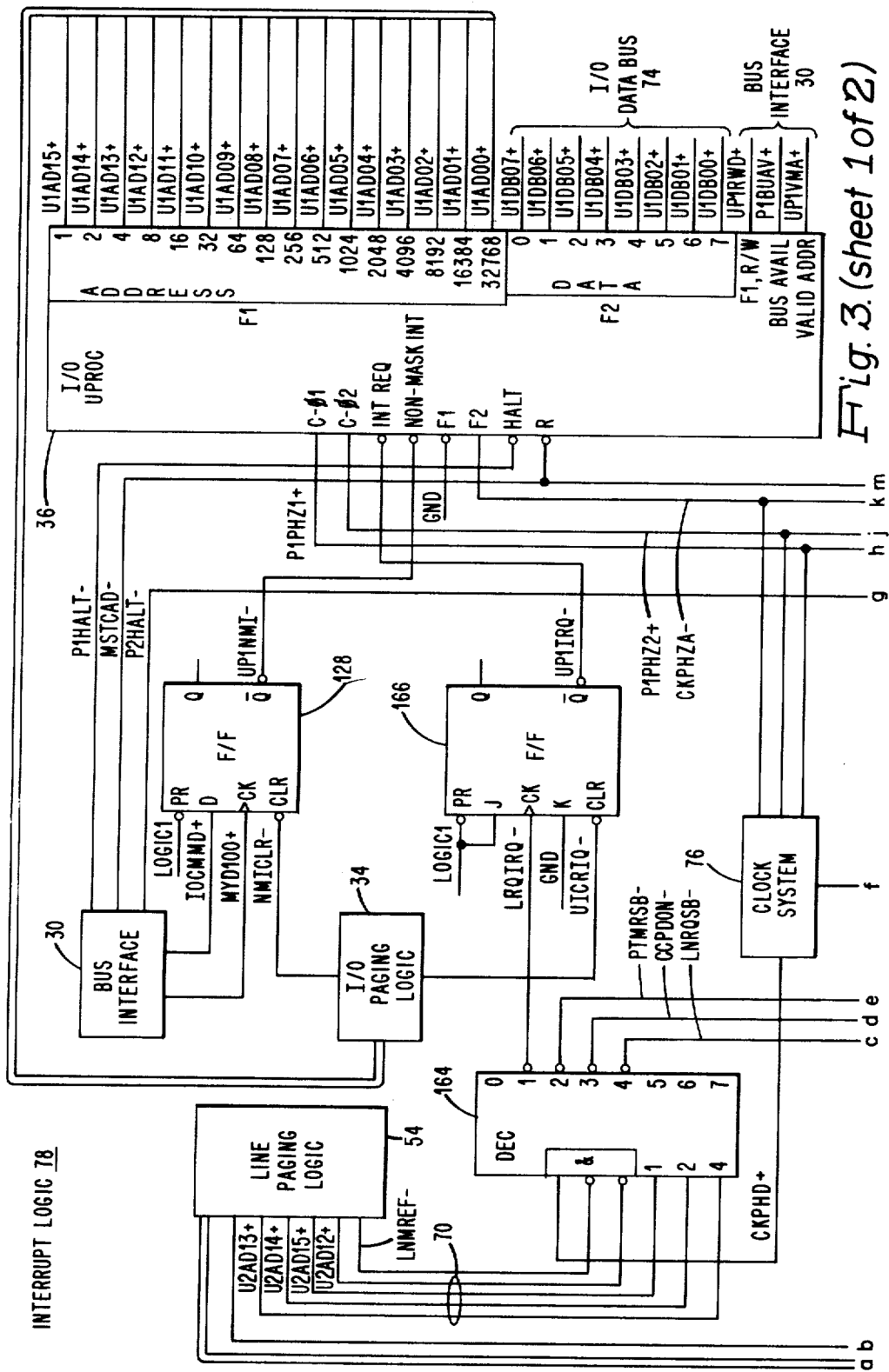
Fig. 3 (sheet 1 of 2)

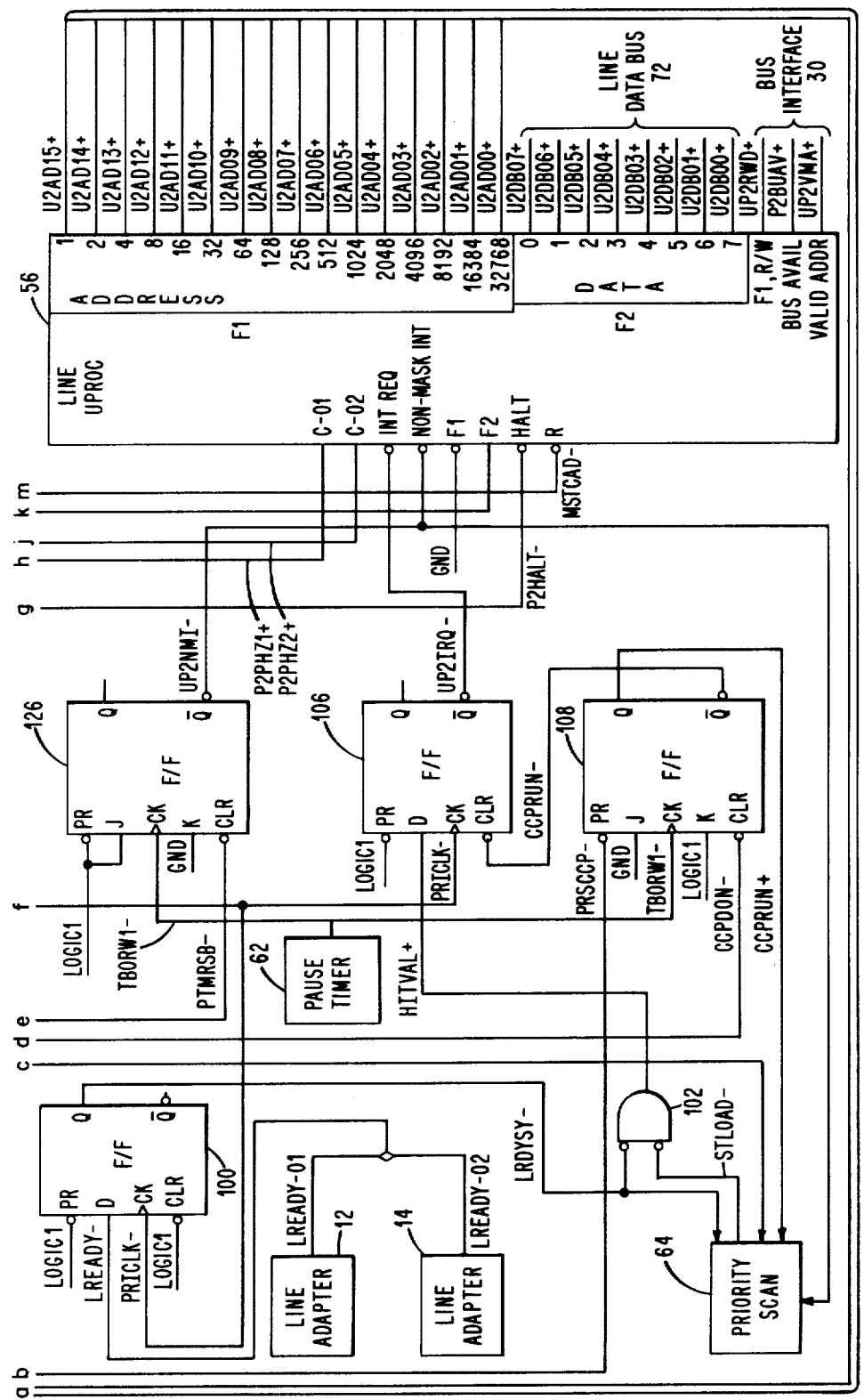
Fig. 3. (sheet 2 of 2)

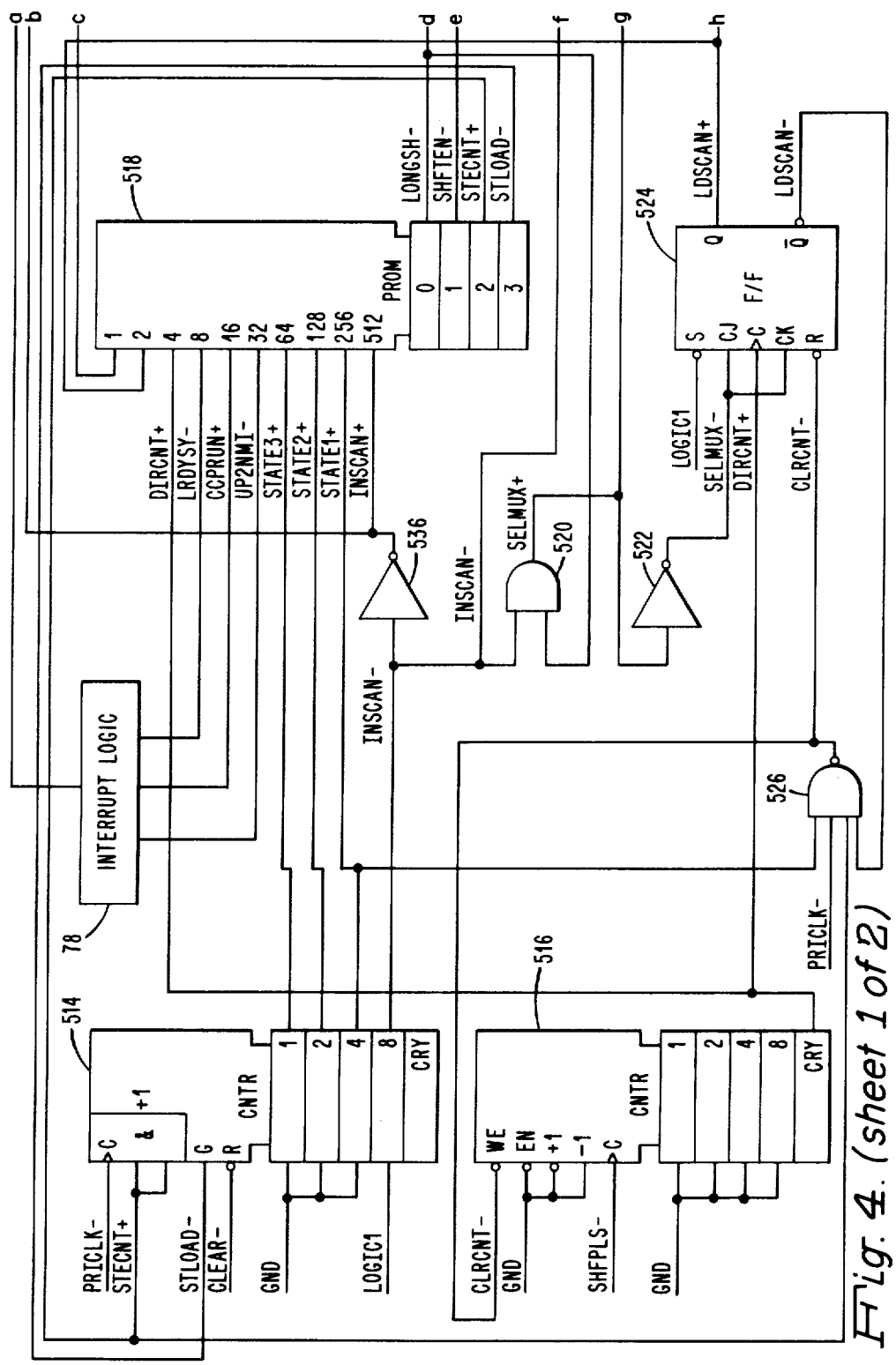
Fig. 4. (sheet 1 of 2)

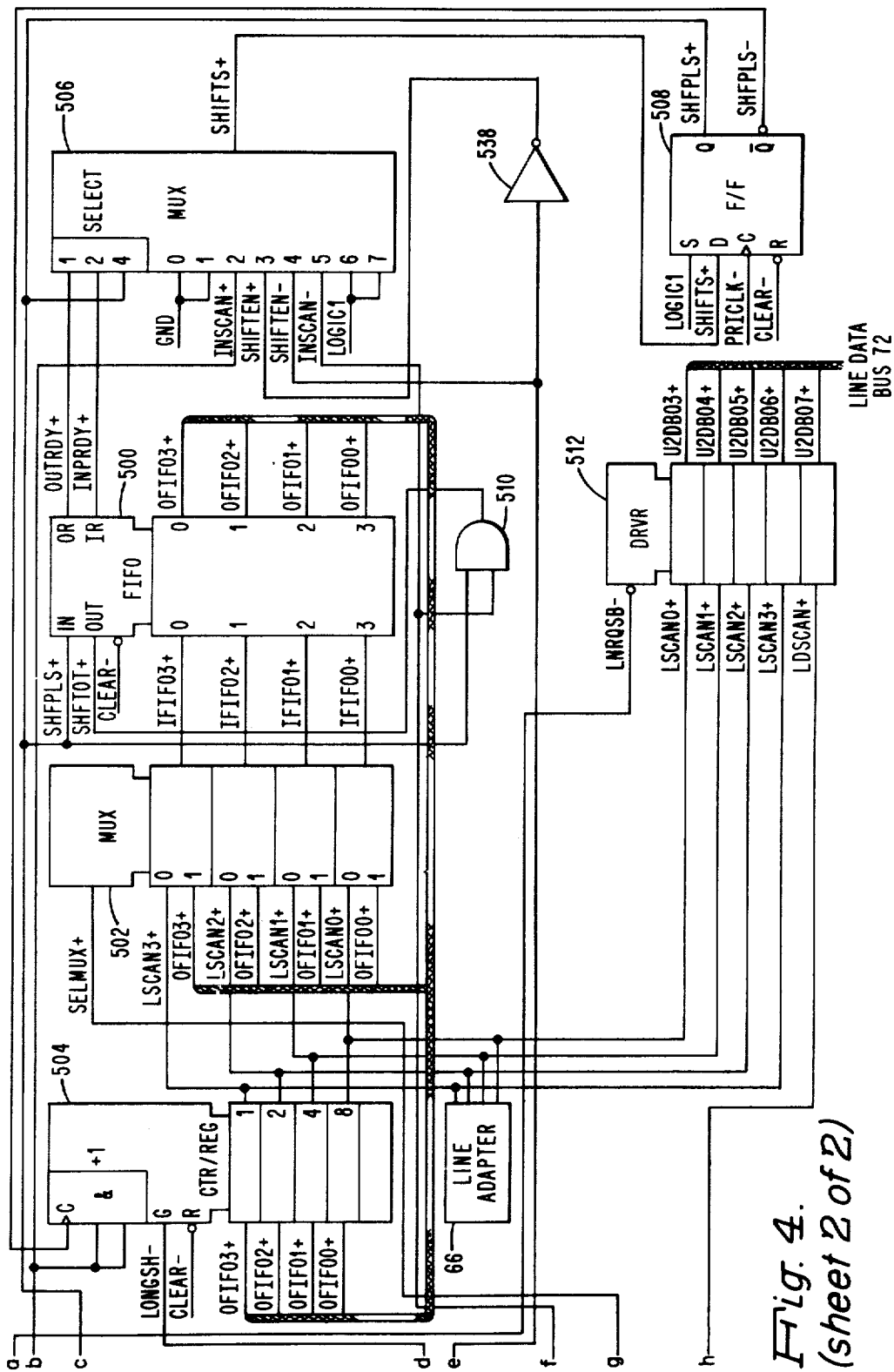
Fig. 4. (sheet 2 of 2)

| MODE | 1 | | | | 2 | | | 3 | | | 4 | | | 5 | | 6 | | | | | 7 | |
|---|---|---|---|---|---|---|---|---|---|---|---|---|---|---|---|---|---|---|---|---|---|---|
| COLUMN | A | B | C | D | E | F | G | H | I | J | K | L | M | N | O | P | Q | R | S | T | U | V |
| INSCAN + | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| STATE1 + | 0 | 0 | 0 | 0 | 0 | 0 | 0 | 0 | 0 | 0 | 0 | 0 | 0 | 0 | 0 | 1 | 1 | 1 | 1 | 1 | 1 | 1 |
| STATE2 + | 0 | 0 | 0 | 0 | 0 | 0 | 0 | 0 | 0 | 0 | 1 | 1 | 1 | 1 | 1 | 0 | 0 | 0 | 0 | 0 | 0 | 0 |
| STATE3 + | 0 | 0 | 0 | 0 | 0 | 0 | 0 | 1 | 1 | 1 | 0 | 0 | 0 | 1 | 1 | 0 | 0 | 0 | 0 | 0 | 1 | 1 |
| UP2NMI + | X | X | X | X | X | X | X | X | X | X | X | X | X | X | X | X | 0 | 0 | 1 | 1 | X | X |
| CCPRUN + | X | X | X | X | X | 0 | 1 | X | X | X | X | X | X | X | X | 1 | 0 | 0 | 0 | 0 | X | X |
| LRDYSY − | X | X | X | X | 1 | 0 | 0 | X | X | X | X | X | X | X | X | X | X | X | X | X | X | X |
| DIRCNT + | 0 | 0 | 1 | 1 | X | X | X | 0 | 1 | X | 1 | 0 | X | 0 | 1 | X | X | X | X | X | X | X |
| LDSCAN + | 0 | 1 | 0 | 1 | X | X | X | 0 | 0 | 1 | 0 | 0 | 1 | X | X | X | 0 | 1 | 0 | 1 | X | X |
| SHFPLS + | X | X | X | X | X | X | X | X | X | X | X | X | X | X | X | X | X | X | X | X | 1 | 0 |
| LONGSH − | 1 | 1 | 1 | 1 | 0 | 1 | 1 | 1 | 1 | 1 | 1 | 1 | 1 | 1 | 1 | 1 | 1 | 0 | 0 | 0 | 0 | 1 |
| SHFTEN − | 0 | 0 | 0 | 1 | 0 | 1 | 1 | 0 | 0 | 1 | 0 | 0 | 1 | 0 | 1 | 1 | 1 | 0 | 0 | 0 | 0 | 1 |
| STECNT + | 0 | 0 | 0 | 0 | 0 | 0 | 1 | 0 | 1 | 1 | 0 | 1 | 1 | 0 | 1 | 0 | 1 | 1 | 1 | 1 | 0 | 0 |
| STLOAD − | 1 | 1 | 1 | 0 | 0 | 0 | 1 | 1 | 1 | 1 | 1 | 1 | 1 | 1 | 1 | 1 | 1 | 1 | 1 | 1 | 1 | 0 |

0 = LOGICAL ZERO
1 = LOGICAL ONE
X = DON'T CARE

*Fig. 5.*

|  I1  |  R1  |  R2  |  R3  |  R4  |
|------|------|------|------|------|
|      |  04  |  0F  |  1F  |  05  |
|      |  ↕   |  ↕   |  ↕   |  1F  |
|      |      |      |      |  ↕   |
|      |  00  |  06  |  10  |  10  |
|  1E  |  1F  |  04  |  0F  |  0F  |
|  ↕   |  ↕   |  ↕   |  ↕   |  ↕   |
|  10  |  10  |  00  |  06  |  06  |
|  0F  |  0F  |  1F  |  04  |  04  |
|  ↕   |  ↕   |  ↕   |  ↕   |  ↕   |
|  00  |  06  |  10  |  00  |  01  |
| 1F₁₆ | 05₁₆ | 05₁₆ | 05₁₆ | 00₁₆ |

|  T1  |  T2  |  T3  |
|------|------|------|
|  16  |  1F  |  17  |
|  ↕   |  ↕   |  1F  |
|      |      |  ↕   |
|  10  |  18  |  18  |
|  0F  |  16  |  16  |
|  ↕   |  ↕   |  ↕   |
|  06  |  10  |  10  |
|  04  |  0F  |  0F  |
|  ↕   |  ↕   |  ↕   |
|  00  |  06  |  06  |
|  05  |  04  |  04  |
|  1F  |  ↕   |  ↕   |
|  ↕   |  00  |  00  |
|  18  |  05  |      |
|      |      |      |
| 17₁₆ | 17₁₆ | 05₁₆ |

*Fig. 6.*

COMMUNICATION MULTIPLEXER VARIABLE PRIORITY SCHEME

RELATED APPLICATIONS

The following U.S. patent applications filed on an even date with the instant application and assigned to the same assignee as the instant application are related to the instant application.

1. "A Communication Multiplexer Having Dual Microprocessors" by Kin C. Yu and Gary J. Goss, filed on Sept. 29, 1980 and having U.S. Ser. No. 192,126.

2. "A Communication Multiplexer Sharing A Free Running Timer Among Multiple Communication Lines" by Kin C. Yu and Gary J. Goss, filed on Sept. 29, 1980 and having U.S. Ser. No. 191,626.

3. "A Communication Multiplexer Having A Variable Priority Scheme Using A Read Only Memory" by Gary J. Goss and Angelo David Kachemov, filed on Sept. 29, 1980 and having U.S. Ser. No. 191,875.

4. "A Communication Multiplexer Having An Apparatus For Establishing A Single Line Priority" by Kin C. Yu and Angelo David Kachemov, filed on Sept. 29, 1980 and having U.S. Ser. No. 191,580.

5. "A Communication Multiplexer Using A Random Access Memory For Storing An Acknowledge Response To An Input/Output Command From A Central Processor" by Kin C. Yu and Gary J. Goss, filed on Sept. 29, 1980 and having U.S. Ser. No. 192,127.

BACKGROUND OF THE INVENTION

1. Field of the Invention

This invention relates primarily to data processing systems and more particularly to a communication multiplexer using a first in-first out memory for storing a variable list of channel numbers used in polling a plurality of devices coupled to the communication multiplexer by communication lines.

2. Description of the Prior Art

A data processing system may include a central processing unit, a main memory and a plurality of input/output devices. Since a number of input/output devices may request operation at the same time with the central processing unit or the main memory, a system of priorities must be established so that the system can operate with the input/outout devices in an orderly fashion. The *Encyclopedia of Computer Science*, edited by Ralston and Meek, Copyright 1976 by Mason/Charter Publishers Inc. describes a number of polling techniques of the input/output devices. They include a "radial selector" or a private line arrangement; and a "daisy chain" or party line arrangement. In either arrangement, the input/output devices may be passive and respond to a polling signal which queries each input/output device in turn; or the input/output devices may be active and generate their own interrupt signal.

U.S. Pat. No. 4,261,033 issued Apr. 7, 1981 entitled "Communications Processor Employing Line-Dedicated Memory Tables for Supervising Data Transfers" describes a system having active channels. Each input/output device requesting service sends its channel number to the communication multiplexer which gives highest priority to the lowest channel number. These types of priority resolving systems allow the higher priority devices to "hog" the system. (This works to the disadvantage of a system having equal performance input/output devices such as a bank of cathode ray tube displays.)

U.S. Pat. No. 4,271,467 issued June 2, 1981 entitled "I/O Priority Resolver" describes apparatus including a read only memory which is responsive to interrupt signals from the input/output for selecting the highest priority input/output device requesting service. Here the order of priority is fixed in the read only memory. To change the order of priority requires a different read only memory.

These types of systems have a fixed priority wired into the system and have the disadvantage of some input/output devices being able to "hog" the system while other input/output devices do not get their share of system access.

The hardware required is reduced by the use of a microprocessor controlling communication lines through the use of channel control blocks stored in a memory. Such a system is described in U.S. Pat. No. 4,133,030 entitled "Control System Providing for the Transfer of Data in a Communications Processing System Employing Channel Dedicated Control Blocks". This system, however, limited the throughput by restricting the number of communication lines that could be processed.

It should be understood that the references cited herein are those which the Applicants are aware of and are presented to acquaint the reader with the level of skill in the art and may not be the closest reference to the invention. No representation is made that any search has been conducted by the Applicants.

OBJECTS OF THE INVENTION

Accordingly, it is a primary object of the invention to provide a data processing system including a communication subsystem and having improved performance.

It is another object of the invention to provide a communication subsystem having apparatus for storing a list of channel numbers and varying the order of the channel numbers to equalize the availability of the input/output devices to a communication controller.

SUMMARY OF THE INVENTION

A communication system includes a communication controller and a number of devices, typically cathode ray tube displays, each coupled to the communication controller via a communication line. Each communication line is operative as a receive channel wherein data flows from the device, or as a transmit channel wherein data flows to the device. Each communication line is identified by a receive channel number and a transmit channel number. This invention gives high priority to a most recently used receive channel operative in a burst mode and equal priority to all transmit channels.

During initialization, a counter/register in the communication controller stores a list of channel numbers in a predetermined sequence in a first in-first out memory (FIFO). The receive channel numbers which are loaded into the FIFO first have a high priority followed by the transmit channel numbers which have a low priority.

The communication channels are polled by loading a channel number into the counter/register from the FIFO output and sending that channel number to all communication lines. If no communication line responds, then that channel number is loaded into the FIFO input and the next channel number is loaded into the counter/register.

When a communication channel requires service, it responds to its channel number which then remains stored in the counter/register. The remaining channel numbers are recirculated in the FIFO so that the first receive channel number is at the FIFO output.

When the servicing of the communication channel is completed, the polling is continued. If a receive channel was serviced, then that receive channel is polled immediately. This gives top priority to a high-speed receive channel. If a transmit channel is serviced, then the transmit channel number is loaded into the FIFO input via a multiplexer and the first receive channel is loaded from the FIFO output to the counter/register. This assures the first priority to the receive channels.

The channel number of the serviced communication channel is loaded into the FIFO in the next position. Thus, a receive channel number is placed at the beginning of the receive channel sequence; and a transmit channel number is placed at the end of the transmit channel sequence.

The novel features which are believed to be characteristic of the invention both as to its organization and method of operation, together with further objects and advantages, will be better understood from the following description when considered in connection with the accompanying drawings. It is expressly understood, however, that each of the drawings is given for the purpose of illustration and description only and is not intended as a definition of the limits of the present invention.

BRIEF DESCRIPTION OF THE DRAWINGS

FIG. 2 is an overall block diagram of the communication controller 10.

FIG. 3 is a logic diagram of the I/O microprocessor 36 and line microprocessor 56 interrupt logic.

FIG. 4 shows the detailed logic of priority scan 64.

FIG. 5. shows the output signals of the read only memory 518 during the various modes of operation.

FIG. 6 shows a typical example of the variable channel number list stored in the first in-first out memory after various modes of operation.

DESCRIPTION OF THE PREFERRED EMBODIMENT

Figure 1:
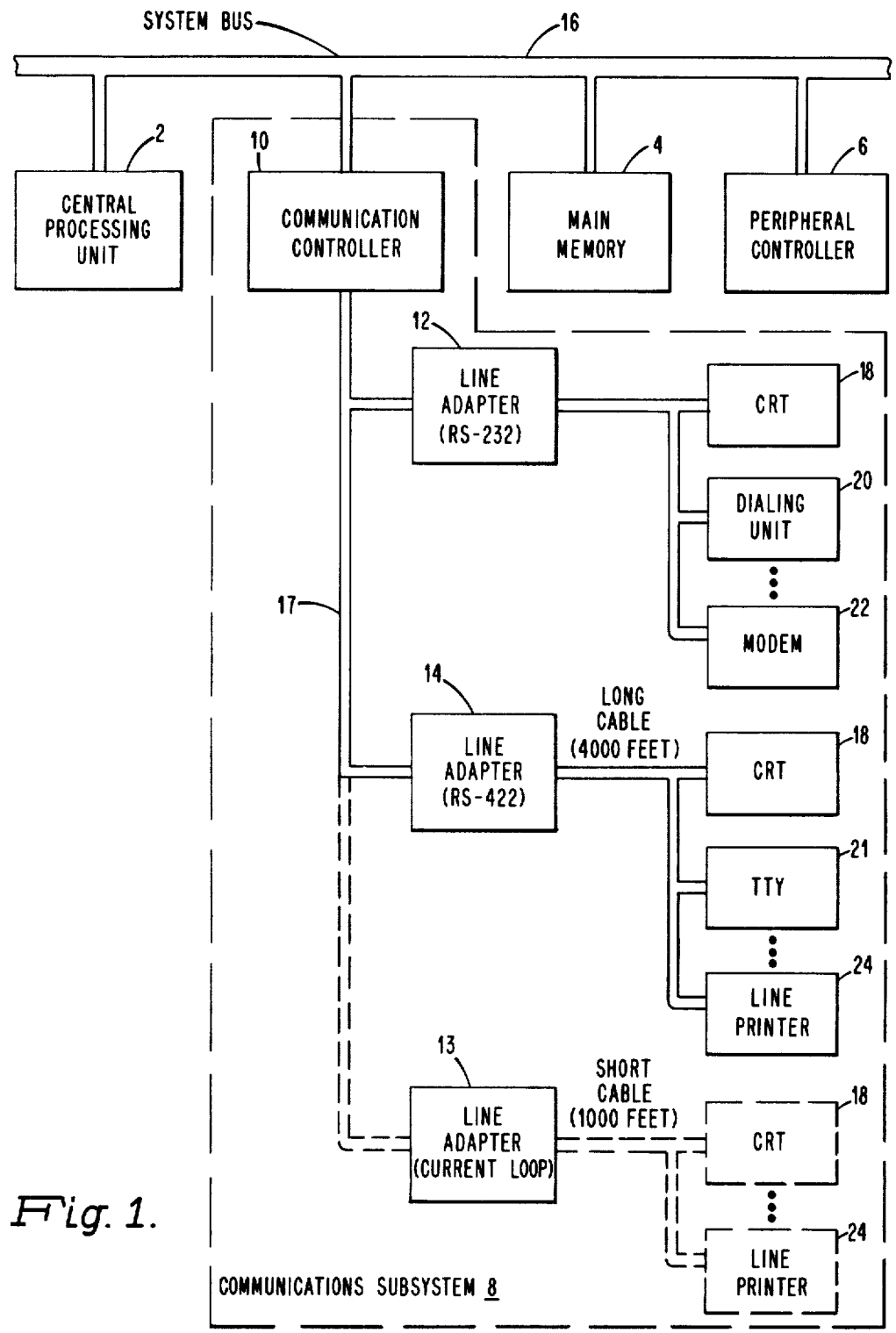
FIG. 1 is an overall block diagram of the data processing system.

FIG. 1 shows a block diagram of the overall data processing system including a central processing unit (CPU) 2, a main memory 4, a communication subsystem 8 and typically a peripheral controller 6, all coupled in common to a system bus 16.

The communication subsystem 8 may be operative with a maximum of 16 communication lines and includes a communication controller 10 coupled to system bus 16, and a plurality of line adapters with their associated devices coupled to the communication controller 10 by a line adapter bus 17.

Typically, communication subsystem 8 may include a line adapter 12 having RS232 interfaces, a line adapter 14 having RS422 interfaces or a line adapter 13 having current loop interfaces. Line adapter 14 has the capability of driving up to 4000 feet of cable and line adapter 13 has the capability of driving up to 1000 feet of cable.

The RS232 interface is described in "EIA RS-232C" dated 1979 and published by the Electronics Industries Association, 2001 I Street, N.W., Washington, D.C.

The RS422 interface is described in "EIA RS-422" dated 1975 and also published by the above Electronics Industries Association.

The current loop interface is described in the "Bell System Communication-Technical Reference-45, 55 and 75 Baud Printer Line Channels-Interface Specification" which is dated December, 1967 and published by AT&T.

Typical devices operative with the communication controller 10 include a cathode ray tube display (CRT) 18, a dialing unit (801C) 20, a MODEM (202C) 22, a teletype unit (TTY33) 21, and a line printer 24.

Line adapters 13 and 14 may each service up to eight asynchronous lines; line adapter 12 may service up to eight asynchronous lines or up to six asynchronous lines and one synchronous line. However, only two line adapters servicing a maximum of 16 lines may be operative with the communication controller 10.

FIG. 2 shows a block diagram of communication controller 10 which includes an I/O microprocessor 36 which controls the operation of the communication controller 10 with CPU 2 and main memory 4 over system bus 16, and line microprocessor 56 which controls the operation of the communication controller 10 with the line adapters 12 and 14 over line adapter bus 17.

The I/O microprocessor 36 and the line microprocessor 56 communicate with each other through a shared random access memory (RAM) 44 which stores the line control tables (LCT) and communication control blocks (CCB) and a number of mailboxes. Each of the devices is assigned an LCT. Half of the LCT controls the device in a receive mode and the other half of the LCT controls the device in a transmit mode. Similarly, each of the devices is assigned a CCB for each receive block transfer with main memory 4, and a CCB for each transmit block transfer with main memory 4. The LCT and CCB operations are described in the aforementioned U.S. Pat. No. 4,133,030 which is hereby incorporated by reference.

Line control tables identify the number of bits in the device data character, whether the character is odd or even parity, the cycle redundancy check (CRC) formula used and the CRC bytes being developed, the status of the device and pointers to enable the LCT to be operative with a channel control program (CCP).

The CCB stores the main memory 4 address location for the next character either transmitted or received, and the number of characters remaining for processing in the current block. The CCB also stores a control word indicating the last block for transmission, if the CCB was executed, and whether to generate an interrupt upon completion of a block, and a number of status bits indicating the line status at the time the CCB completed. Up to four receive CCB's and up to four transmit CCB's may be stored per device.

A programmable read only memory (PROM) 38 stores the programs that operate with the I/O microprocessor 36. The I/O microprocessor generates signals indicative of an address location in PROM 38 and sends the signals via an I/O paging logic 34 and an I/O address bus 18 to PROM 38. An instruction at that address location is transferred from PROM 38 to the I/O microprocessor 36 via an I/O data bus 74. The I/O microprocessor 36 executes that instruction and generates the address signals indicating the next address location of PROM 38 to read the next instruction over I/O data bus 74.

A work RAM 40 operates with the I/O microprocessor 36 as a scratchpad memory for storing variable data, for stack operation, i.e., storing the return address of an interrupted microprogram, and for providing working storage for data manipulation.

The I/O paging logic 34 receives a virtual address from I/O microprocessor 36 when the I/O microprocessor addresses the LCT or CCB area of shared memory 44 and generates a real address for identifying a location with the LCT or CCB area of a particular channel associated with a selected device. The paging operation is described in U.S. Pat. No. 4,290,104 issued Sept. 15, 1981 entitled "Paging Mechanism".

A bus interface 30 couples the communication controller 10 to the system bus 16 for operation with main memory 4 and CPU 2. The bus request, bus acknowledge, and bus priority operations are described in U.S. Pat. No. 3,993,981 entitled "Apparatus for Processing Data Transfer Requests in a Data Processing System" which is hereby incorporated by reference. Bus interface 30 also provides storage for data and I/O commands that are transferred over system bus 16.

A RAM 60 stores the channel control program (CCP) which processes the data stream of a communication channel. A CCP pointer in the LCT points to the next CCP location in RAM 60 to be referenced by the channel when a channel request interrupt is serviced. The CCP typically controls the transfer of characters between a line adapter interface 66 and shared RAM 44 through line microprocessor 56, performs the check redundant character computation and performs minor editing.

A PROM 58 stores the programs that operate with the line microprocessor 56. The line microprocessor 56 generates address signals indicating an address location in PROM 58 and sends the address signals via a line paging logic 54 and a line address bus 70 to PROM 58. An instruction at that address location is transferred from PROM 58 to line microprocessor 56 via a line data bus 72. The line microprocessor 56 executes that instruction and generates the address signals indicating the next address location of PROM 58 to read the next instruction over line data bus 72.

A work RAM 52 operates as a scratchpad memory for line microprocessor 56 as does work RAM 40 for I/O microprocessor 36.

Line paging logic 54 receives a virtual address which is converted into a real address when addressing the LCT or CCB areas in shared RAM 44. As with I/O paging logic 34, line paging logic 54 allows a single program to address the LCT or CCB associated with any communication channel (2 channels per line: a receive channel and a transmit channel).

An S register 50 is a one byte index register which is operative with PROM 58.

A pause timer 62 detects if a CCP is running too long by counting the number of accesses to RAM 60. If the number of accesses exceeds a predetermined number, typically 100, the line microprocessor 56 is interrupted, the CCP is temporarily deactivated, and a CCP return address is stored in a queue in work RAM 52.

A priority scan 64 accepts data requests associated with each channel of the device adapters and establishes the priorities for servicing the channels in a dynamically variable sequence. This is described in copending related U.S. Application Ser. No. 191,875 entitled "A Communication Multiplexer Having a Variable Priority Scheme Using A Read Only Memory" and U.S. Application Ser. No. 191,580 entitled "A Communication Multiplexer Having An Apparatus For Establishing A Single Line Priority".

The line adapter interface 66 couples the line adapters 12 and 14 to the communication controller 10 through line adapter bus 17.

The I/O microprocessor 36 implements a number of functions including handling of I/O instructions from the CPU 2 to the communication controller 10 and the controlling of the transfer of data between line microprocessor 56 and main memory 4. Line microprocessor 56 in conjunction with PROM 38 acts as an interpreter of the CCP. When a CCP instruction which requests a byte to be transferred to/from main memory 4 is decoded by line microprocessor 56, it stores the number of the channel currently being serviced and the data byte of the transfer to main memory in the mailbox in shared memory 44. The line microprocessor 56 generates an interrupt through an interrupt logic 78 to the I/O microprocessor 36. The I/O microprocessor 36 in conjunction with PROM 38 will address the mailbox in shared RAM 44 for the channel number and command code as well as the data byte, if this is a receive operation, and address the current CCB of this channel via I/O paging logic 34 for the current main memory address. The I/O microprocessor 36 will transfer the memory address and the data byte to bus interface 30 where the main memory 4 address and the data byte are stored awaiting an acknowledge in response to a bus request for transfer to main memory 4.

Interrupt logic 78 is also responsive to signals from bus interface 30 to interrupt the I/O microprocessor to accept system bus 16 information addressed to communication controller 10.

Interrupt 78 is also responsive to a signal from pause timer 62 to interrupt line microprocessor 56 when the number of CCP instructions exceeding the predetermined number; responsive to a signal from priority scan 64 to interrupt line microprocessor 56 to start a polling of the devices; and responsive to a signal from line adapter 66 to interrupt the line microprocessor 56 when a device responds to the poll.

The I/O microprocessor 36, in conjunction with a free running timer 32, may indicate to the line microprocessor 56 to start a predetermined operation after a time delay determined by the line microprocessor 56. The free running timer 32 is described in related copending U.S. Application Ser. No. 191,626 entitled "A Communication Multiplexer Sharing A Free Running Timer Among Multiple Communication Lines".

A clock system 76 generates the phase 1 and phase 2 clock signals for I/O microprocessor 36 and line microprocessor 56 as well as a number of timing signals which are described infra.

The I/O microprocessor 36 when receiving an I/O command from CPU 2 may generate an I/O instruction to line microprocessor 56 through a mailbox in shared memory 44 in order to control the CCP stored in RAM 60. This is described in copending related U.S. Application Ser. No. 192,127 entitled "A Communication Multiplexer Using A Random Access Memory For Storing An Acknowledge Response To An Input/Output Command From A Central Processor".

A transceiver (XCVR) 46 and a XCVR 48 isolate the I/O data bus 74 from the line data bus 72. Similarly, a MUX and control 42 isolates the I/O address bus 68 from the line address bus 70 and couples shared RAM 44 to either I/O address bus 68 or line address bus 70.

Referring to FIG. 3, signal LREADY-01 or LREADY-02 at logical ZERO indicates that a device on a communication line coupled to line adapter 12 or 14 requests service by responding to the poll by priority scan 64. Forcing signal LREADY- to logical ZERO resets a flop 100 on the rise of a clock signal PRICLK−. Output signal LRDYSY− at logic ZERO is applied to an input of a NAND gate 102. Signal STLOAD−, the output of priority scan 64, is at logical ZERO during the polling operation as described in copending related U.S. Application Ser. No. 191,875 entitled "A Communication Multiplexer Having A Variable Priority Scheme Using A Read Only Memory".

A flop 106 sets on the next rise of clock signal PRICLK− since the D input signal HITVAL+, the output of a NAND gate 102, is at logical ONE. This forces the output signal UP2IRQ− to logical ZERO, thereby forcing line microprocessor 56 into an interrupt sequence. Line microprocessor 56 generates addresses FFF8$_{16}$ and FFF9$_{16}$ on address lines U2AD00+00 through U2AD15+00 through line paging logic 54 onto line address bus 70 and begins to process instructions stored in PROM 58 and CCP's stored in RAM 60. Signal PRSCCP− is forced to logical ZERO by logic responsive to address signals FFF8$_{16}$ and FFF9$_{16}$ in line paging logic 54. This sets a flop 108. Signal CCPRUN− at logical ZERO resets flop 106 and signals the priority scan 64 that the CCP is active. Interrupt signal UP2IRQ− is forced to logical ONE.

The CCP's control the operation of the communication lines. Each instruction of the CCP calls for a program routine in PROM 62. Line microprocessor 56 performs the instructions of the program routine to perform the CCP instruction.

When the line microprocessor 56 has completed its operation with the communication line, it generates an address 00F1$_{16}$. Line paging logic 54 is responsive to address 00F1$_{16}$ and generates signal LNMREF− at logical ZERO. A decoder 164 is activated and signal LRQIRQ− is forced to logical ZERO. This sets a flop 166 and output signal UP1IRQ− at logical ZERO forces I/O microprocessor 36 into an interrupt mode.

I/O microprocessor 36 generates addresses FFF8$_{16}$ and FFF9$_{16}$. Signal U1CRIQ− from I/O paging logic 34 is responsive to address FFF8$_{16}$ and resets flop 166. The I/O microprocessor 36 is controlled by the program routine stored in PROM 38 to process data in accordance with command signals stored in the mailbox in shared memory 44 by line microprocessor 56.

The CPU 2 may control the communication controller 10 by sending I/O commands over system bus 16. These I/O commands set up the LCT's and CCB's or read the LCT's and CCB's. As an example, one input/output command will set the main memory 4 address in a CCB. Another input/output command will set the range in that CCB. The input/output command operation is described in copending related U.S. Application Ser. No. 921,127 entitled "A Communication Multiplexer Using A Random Access Memory For Storing An Acknowledge Response To An Input/Output Command From A Central Processor".

Bus interface 30 generates signal IOCMMD+ when an input/output command is received from CPU 2 over system bus 16. Output signal IOCMMD+ sets a flop 128 on the rise of timing signal MYD100+ from bus interface 30. Interrupt signal UP1NMI− at logical ZERO is applied to the non-maskable interrupt input terminal of I/O microprocessor 36 which generates interrupt vector addresses FFFC$_{16}$ and FFFD$_{16}$. The input/output command includes a function code which modifies interrupt vector address FFFC$_{16}$ in the I/O paging logic 34 to point to an address location in PROM 38 which stores the starting address of the program which executes the input/output command specified by the function code. Interrupt vector address FFFC$_{16}$ generates signal NM1CLR− in I/O paging logic 34 to reset flop 128.

A flop 126 sets on the rise of the TBORW1− signal from pause timer 62 when the pause timer 62 times out. Interrupt signal UP2NMI− at logical ZERO is applied to the non-maskable interrupt terminal of line microprocessor 56 which generates interrupt vector addresses FFFC$_{16}$ and FFFD$_{16}$. The contents of address locations FFFC$_{16}$ and FFFD$_{16}$ in PROM 58 generate a program address for processing the pause timer 62 time out. Flop 126 is reset during a stop timer or a WAIT instruction when signal PTMRSB−, the output of decoder 164, is forced to logical ZERO.

A number of timing and control signals are applied to the input terminals of I/O microprocessor 36 and line microprocessor 56. Signals P1PHZ1+, P1PHZ2+, P2PHZ1+ and P2PHZ2+ applied to the ∅1 and ∅2 terminals provide the basic timing. Signal CKPHZA− applied to the F2 terminal enables the data bus during a microprocessor write cycle and disables the data bus during a microprocessor read cycle. The signals P1HALT− and P2HALT− at logical ZERO applied to the HALT terminal will halt the microprocessor after the instruction is executed. Signal MSTCAD− applied to the R terminal starts the microprocessor when power is turned on.

FIG. 4 shows the detailed logic of priority scan 64. FIG. 5 shows the output status of a PROM 518 for the various input configurations as shown in columns A through V.

There are 7 modes in the priority scan 64 operation.

Mode 1

Signal INSCAN+ at logical ONE

This is the initialization mode in which FIFO 500 is loaded with 31 of the 32 channel numbers. The 32nd channel number is loaded into a counter/register 504. Since FIFO 500 stores 4 bits in each memory location, an LDSCAN flop 524 is reset for the 16 receive channel numbers and set for the 16 transmit channel numbers. The receive channel numbers identified by signal LDSCAN+ at logical ZERO have priority over the transmit channel numbers identified by signal LDSCAN+ at logical ONE. The receive channel numbers are loaded into FIFO 500 before the transmit channel numbers.

Mode 2

Signal INSCAN+ at logical ZERO
Signal STATE1+ at logical ZERO
Signal STATE2+ at logical ZERO
Signal STATE3+ at logical ZERO Each 5-bit channel number, signals LSCAN0+, LSCAN1+, LSCAN2+, LSCAN3+ and LDSCAN+, in turn are sent to the devices. The device requesting service generates a signal LREADY− at logical ZERO when receiving the channel number. This interrupts line microprocessor 56 to execute the channel request by means of a CCP.

Mode 3

Signal INSCAN+ at logical ZERO
Signal STATE1+ at logical ZERO

Signal STATE2+ at logical ZERO
Signal STATE3+ at logical ONE
(a) Receive channel operative.
The remaining receive channel numbers are recirculated after which the first transmit channel number is at the FIFO 500 output.
(b) Transmit channel operative.
No action by priority scan 64 logic.
Mode 4
Signal INSCAN+ at logical ZERO
Signal STATE1+ at logical ZERO
Signal STATE2+ at logical ONE
Signal STATE3+ at logical ZERO
(a) Receive channel operative.
FIFO 500 begins recirculation of transmit channel numbers from output to input.
(b) Transmit channel operative.
No action by priority scan 64 logic.
Mode 5
Signal INSCAN+ at logical ZERO
Signal STATE1+ at logical ZERO
Signal STATE2+ at logical ONE
Signal STATE3+ at logical ONE
(a) Receive channel operative.
Recirculation of transmit channel numbers. At the completion of the recirculation, the first receive channel number is at the output of FIFO 500.
(a) Transmit channel operative.
Recirculation of transmit channel numbers. At the completion of the recirculation, the first receive channel number is at the output of FIFO 500.
Priority is given to receive channels by recirculating channel numbers of FIFO 500 until the first receive channel number is at the FIFO 500 output.
Mode 6
Signal INSCAN+ at logical ZERO
Signal STATE1+ at logical ONE
Signal STATE2+ at logical ZERO
Signal STATE3+ at logical ZERO
Priority scan 64 logic is in a WAIT mode until line microprocessor 56 signals that the CCP is completed and signal CCPRUN is at logical ZERO. Then:
(a) Receive channel operative.
(1) No pause timer 62 timeout.
No action by priority scan 64 logic.
(2) Timeout by pause timer 62.
Start cycle to recirculate receive channel number stored in counter/register 504 into FIFO 500 input, thereby preventing communication controller 10 from "hanging up" due to a malfunction with a particular channel.
(b) Transmit channel operative.
(1) No pause timer 62 timeout.
Start cycle to load transmit channel number stored in counter/register 504 into FIFO 500 input.
(2) Timeout by pause timer 62.
Start cycle to load transmit channel number stored in counter/register 504 into FIFO 500 input.
Mode 7
Signal INSCAN+ at logical ZERO
Signal STATE1+ at logical ONE
Signal STATE2+ at logical ZERO
Signal STATE3+ at logical ONE
(a) Receive channel operative.
(1) No pause timer 62 timeout.
Go to Mode 2.
(2) Timeout by pause timer 62.
Load receive channel number at output of FIFO 500 into counter/register 504 and go to Mode 2.
(b) Timeout channel operative.
(1) No pause timer 62 timeout.
Load receive channel number at output of FIFO 500 into counter/register 504 and go to Mode 2.
(2) Timeout by pause timer 62.
Load receive channel number at output of FIFO 500 into counter/register 504 and go to Mode 2.

Modes 2 through 5 provide top priority to a high-speed device whose receive channel number is loaded into counter/register 504, next priority is given to the devices requesting the receive channel and last priority is given to devices requesting the transmit channel. The last receive channel processed has the highest priority and the last transmit channel processed has the lowest priority.

The description of the detailed logic of the priority scan 64 describing the 7 modes of operation follows using FIGS. 4 and 5.

Mode 1—Initialize
PROM 518 provides the output signals as shown in columns A, B, C and D of FIG. 5.

For columns A, B and C, the output signals are LONGSH− and STLOAD− at logical ONE; and SHFTEN− and STECNT+ at logical ZERO.

FIFO 500 is loaded with 31 channel numbers. The 32nd channel number $F_{16}$ remains stored in counter/register 504. FIFO 500 stores 4 bits in each memory location with the fifth bit of each channel number stored in the LDSCAN flop 524. The 16 receive channel numbers are loaded into FIFO 500 with flop 524 reset, followed by 15 transmit channel numbers with flop 524 set. The channel numbers are loaded into FIFO 500 sequentially from counter/register 504 with the transmit channel number $F_{16}$ remaining in counter/register 504 and flop 524 set.

Signals LONGSH− and INSCAN+ at logical ONE condition counter/register 504 to operate as a counter. Signal CLEAR− at logical ZERO conditioned the output signals of a counter 514 to logical ZERO during the communication controller 10 startup sequence. Signal INSCAN− at logical ZERO forces output signal SELMUX+ from an AND gate 520 to logical ZERO conditioning a multiplexer (MUX) 502 to receive the output signals of counter/register 504.

A shift pulse flop 508 sets for each channel number written into FIFO 500 and resets to increment counter/register 504 to the next channel number. Resetting flop 508 also increments a counter 516 which indicates when the last receive channel number and the last transmit channel number is stored in counter/register 504.

Input signal INPRDY+ at logical ONE indicates that the input of FIFO 500 is available. Output signal OUTRDY+ at logical ONE indicates that the output of FIFO 500 is full. Signals OUTRDY+ and INPRDY+ condition a MUX 506 output signal SHIFTS+ to set or reset flop 508 on the rise of a clock pulse PRICLK−.

Initially counter/register 504 is reset to $0_{16}$ by signal CLEAR− at logical ZERO. Signals INPRDY+ is at logical ONE, OUTRDY+ is at logical ZERO, INSCAN+, the input to MUX 506, is at logical ONE and flop 508 sets on the rise of clock pulse PRICLK−.

Signal SHFPLS+00 at logical ONE applied to the IN terminal of FIFO 500 loads the output signals LDSCAN0+ through LDSCAN3+ into FIFO 500 via MUX 502 and signals IFIF00+ through IFIF03+.

Signal INPRDY+ is forced to logical ZERO when the channel number is received from counter/register 504 and signal SHFPLS+ at logical ONE selects input terminal 4 of MUX 506. Signal SHFTEN— at logical ZERO causes flop 508 to reset. The rise of signal SHFPLS— increments counter/register 504 since signal INSCAN+, the output of an inverter 536, is at logical ONE. As the channel number ripples through FIFO 500, signal INPRDY+ again is forced to logical ONE. Signal OUTRDY+ may be at logical ONE for the next cycle. If this is the case, flop 508 is set since signal SHFTEN—, the output of an inverter 538 applied to input terminal 3 of MUX 506, is at logical ONE.

The rise of signal SHFPLS— increments counter 516. Flop 524 is in a reset state for the first 16 channel numbers identifying the channel numbers as receive channel numbers. When the 16th channel number $F_{16}$ is stored in counter/register 504, carry signal DIRCNT+, the carry output of counter 516, is forced to logical ONE. Signal DIRCNT+ applied to an input of PROM 518 provides the outputs of column C of FIG. 5. Flop 524 sets on the fall of signal DIRCNT+ since signal SELMUX—, the output of an inverter 522, is at logical ONE. Column B of FIG. 5 shows the outputs of PROM 518. The next 15 transmit channel numbers are loaded into FIFO 500. When signal DIRCNT+ is again at logical ONE, the PROM outputs are as shown in column D of FIG. 5. Signal SHFTEN— is forced to logical ONE and signal STLOAD— is forced to logical ZERO preventing flop 508 from setting and loading counter 514 with $8_{16}$. This forces signal INSCAN— to logical ONE and INSCAN+ to logical ZERO. Transmit channel number $F_{16}$ is stored in counter/register 504.

Mode 2

The polling operation begins with signal LREADY— at logical ONE, flop 100 of FIG. 3 set and output signal LRDYSY— at logical ONE, and the outputs of PROM 518 at logical ZERO as shown in column E of FIG. 5. Signals INPRDY+ and OUTRDY+ are at logical ONE since the output of FIFO 500 is full and the input is available. Signal SHFTEN— at logical ONE causes flop 508 to set and signal SHFTEN— at logical ZERO causes flop 508 to reset.

Signal SHFTOT+, the output of an AND gate 510, is at logical ONE. This results in FIFO 500 reading out the channel number over signal lines OFIF00+ through OFIF03+ and storing it in counter/register 504. The previous channel number which was being emitted to the device via line adapter 66 is now loaded into FIFO 500 via MUX 502. The polling operation continues with signal DIRCNT+ conditioning flop 524 to toggle on successive falls of signal DIRCNT+ since signal SELMUX— is at logical ONE.

This polling continues until a device requesting service responds to the channel number emitted from counter/register 504 by forcing signal LREADY— to logical ZERO which in turn forces signal LONGSH— and signal SHFTEN— to logical ONE as shown in column F of FIG. 5. This stops the polling by preventing flop 508 from setting and retaining the interrupting channel number in counter/register 504. Signal LREADY— at logical ZERO resets flop 100 of FIG. 3 forcing signal LRDYSY— to logical ZERO. This interrupts line microprocessor 56. The channel program is started as indicated by signal CCPRUN+ of FIG. 3 at logical ONE. Then as shown in column G of FIG. 5, the outputs of PROM 518 are at logical ONE and counter 514 is incremented by signal STECNT+ at logical ONE to force the priority scan 64 into the next mode.

Mode 3

(a) Receive channel operative.

Assuming that a receive channel responded to its channel number then as shown in column H of FIG. 5, signals LONGSH— and STLOAD— are at logical ONE and signals SHFTEN— and STECNT+ are at logical ZERO. This forces the output of AND gate 520, signal SELMUX+, to logical ONE selecting terminal 1 of MUX 502. Also, flop 508 cycles as described supra since signal SHFTEN+ is at logical ONE. Receive channel numbers recirculate from the output to the input of FIFO 500 via MUX 502 until signal DIRCNT+ is at logical ONE. This forces signal STECNT+ to logical ONE as shown in column I of FIG. 5 and causes counter 514 to be incremented on the rise of clock pulse PRICLK—, placing priority scan 64 in Mode 4.

(b) Transmit channel operative.

Since flop 524 is set and signal LDSCAN+ is at logical ONE, the PROM 518 outputs are at logical ONE as shown in column J of FIG. 5 thereby incrementing counter 514, placing priority scan 64 in Mode 4.

Mode 4

(a) Receive channel operative.

Since signal DIRCNT+ is still at logical ONE during the recirculation of the last receive channel number from the input to the output of FIFO 500 then as shown in column K of FIG. 5, signal SHFTEN— at logical ZERO allows flop 508 to continue cycling. When signal DIRCNT+ falls to logical ZERO, signal STECNT+ is forced to logical ONE as shown in column L of FIG. 5. This increments counter 514 and places priority scan 64 in Mode 5 as the transmit channel numbers begin to recirculate from output to input of FIFO 500 via MUX 502.

(b) Transmit channel operative.

Since flop 524 is set, as shown in column M of FIG. 5, all output signals of PROM 518 are at logical ONE. This increments counter 514 and places priority scan 64 in Mode 5.

Mode 5

(a) Receive channel operative.

Prom 518 output signals LONGSH— at logical ONE and SHFTEN— at logical ZERO as shown in column N of FIG. 5 allow the transmit channel numbers to continue to recycle from the output to the input of FIFO 500 via MUX 502 since flop 508 is setting and resetting. As the last transmit channel number is recirculated, signal DIRCNT+ is forced to logical ONE and, as shown in column O of FIG. 5, all PROM 58 output signals are at logical ONE which places priority scan 64 into Mode 6. FIFO 500 has the old first receive channel number at the output and the last transmit channel number in the last position.

(b) Transmit channel operative.

The PROM 518 output signals as shown in columns N and O of FIG. 5 cause the transmit channel numbers to recirculate as described in Mode 5a supra.

Mode 6

Signals LONGSH—, SHFTEN— and STLOAD— at logical ONE and signal STECNT+ at logical ZERO, as shown in column P of FIG. 5, keep priority scan 64 in a WAIT mode while line microprocessor 56 is processing the channel identified by the number at the outputs of counter/register 504 and flop 524 since signal CCPRUN+ is at logical ONE.

(a) Receive channel operative.

(1) No pause timer 62 timeout.

When signal CCPRUN+ falls to logical ZERO indicating that line microprocessor 56 completed the CCP, then as shown in column Q of FIG. 5, all outputs of PROM 518 are at logical ONE and the priority scan 64 is placed in Mode 7.

(2) Pause timer 62 timeout.

Line microprocessor 56 interrupt signal UP2NMI+ at logical ONE indicates that pause timer 62 timed out; that is, the CCP was active for more than a predetermined number of program steps. Then as shown in column S of FIG. 5, PROM 518 signals LONGSH− and SHFTEN− are at logical ZERO and signals STECNT+ and STLOAD− are at logical ONE. This enables terminals 0 of MUX 502 and loads the channel number stored in counter/register 504 into FIFO 500 via MUX 502 and stores the channel number at the output of FIFO 500 into counter/register 504. Counter 514 is incremented, placing priority scan 64 in Mode 7.

(b) Transmit channel operative.

As shown in columns R and T of FIG. 5, signals LONGSH− and SHFTEN− are at logical ZERO and signals STECNT+ and STLOAD− are at logical ONE. Therefore, regardless of the state of signal UP2-NMI+, the transmit channel number stored in counter/register 504 is loaded into the input of FIFO 500 and the first receive channel number is loaded into counter/register 504 and counter 514 is incremented, placing priority scan 64 in Mode 7.

In either event, signal CLRCNT−, the output of a NAND gate 526, is forced to logical ZERO since the input signals to NAND gate 526, STATE1+, STECNT+, and LDSCAN−, are at logical ONE. This clears counter 516 (which contains $F_{16}$) to logical ZERO. Also, the output of NAND gate 526 is applied to the reset of flop 524 to prevent its setting on the fall of signal DIRCNT+.

Mode 7

If the channel number stored in counter/register 504 is being loaded into FIFO 500 as indicated by signal SHFPLS+ at logical ONE then as shown in FIG. 5, PROM 518 output signals LONGSH− and SHFTEN− allow for the completion of the transfer. When flop 528 is reset, signals LONGSH− and SHFTEN− are at logical ONE and signals STECNT+ and STLOAD− are at logical ZERO as shown in column V of FIG. 5.

Signal STLOAD− at logical ZERO forces the output of counter 514, signals STATE1+, STATE2+ and STATE3+, to logical ZERO and signal INSCAN− to logical ONE forcing the PROM 518 output signals to the state shown in column E of FIG. 5. The polling operation continues as described in Mode 2.

The line microprocessor 56 generates an address $00F4_{16}$ on line address bus 70 to read the channel number into line paging logic 54. Address signal U2AD13+ at logical ONE and address signals U2AD12+, U2AD14+ and U2AD15+ at logical ZERO applied to decoder 164 of FIG. 3 forces signal LNRQSB− to logical ZERO enabling a driver 512 and forcing the active channel number onto the line data bus 72 for storage in line paging logic 54.

Referring to FIG. 6, columns R1 through R5 show the order of the list of channel numbers in FIFO 500 during various modes of operation when a receive channel has responded to its channel number. Columns T1 through T3 show the order of the list of channel numbers in FIFO 500 when a transmit channel has responded to its channel number after a receive channel had responded to its channel number. Column I1 shows the FIFO 500 channel number list after initialization during Mode 1 with channel number 1F being the first channel number polled during Mode 2. The F is the hexadecimal digit stored in counter/register 504 and the 1 is the binary state of the output signal LDSCAN+ of flop 524.

Column R1 shows the list after receive channel 05 has responded to its channel number during Mode 2. Column R2 shows the result of the recirculation of the receive channel numbers to the end of the list in Mode 3. Column R3 shows the result of the recirculation of the transmit channel numbers to the end of the list during Modes 4 and 5.

During Modes 6 and 7, column R4 shows the list having recirculated receive channel number $05_{16}$ to the end of the list and the next receive channel $00_{16}$ is loaded into counter/register 504 (the first 0 indicates signal LDSCAN+ at logical ZERO). The list represented by column R3 indicates no pause timer 62 timeout by receive channel number 05. The former is done to prevent a communication controller 10 "hanging up" by continual timeouts of channel number 05.

The list designated by column R3 or R4 is then polled in Mode 2.

Column T1 shows that channel number 17 responded to its channel number during the Mode 2 poll. Column T2 shows the remaining transmit channel number recirculated to the end of the list in Mode 5. Column T3 shows that in Modes 6 and 7 the transmit channel number is loaded into FIFO 500 and flop 524 is reset, and the first receive channel number 05 at the output of the FIFO 500 is stored in counter/register 504. The polling then continues in Mode 2.

The following logic circuits are described in the *TTL Data Book for Design Engineers*, Second Edition, Coypright 1976, by Texas Instruments Inc.

| | |
|---|---|
| Flops 100, 128 | 74S74 |
| 106 | 74LS74 |
| 108, 126, 166 | 74LS112 |
| 524 | 74LS112 |
| 508 | 74LS74 |
| Decoder 164 | 74LS138 |
| Counters 504, 514 | 74LS161 |
| 516 | 74LS191 |
| MUX 502 | 74LS157 |

The following AM 3341/2841 circuit is described in the *Advanced Micro Devices Databook*, Copyright 1974, by Advanced Micro Devices, 901 Thompson Place, Sunnyvale, Calif. 94086.

FIFO 500: AM 3341/2841

The following 82S137 circuit is described in the *Signetics Data Manual*, Copyright 1976, by the Signetics Corporation, 811 E. Argues Avenue, Sunnyvale, Calif. 94086.

PROM 518: 82S137

Microprocessors 36 and 56 are Motorola 6800B circuits described in *The Complete Microcomputer Data Catalog*, Copyright 1978, by Motorola Semiconductor Products Inc., Box 20912, Phoenix, Ariz.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A data processing system for transferring data bytes comprising:

a system bus;

a main memory coupled to said system bus for storing said data bytes;

a communication multiplexer coupled to said system bus for transferring said data bytes between said main memory and a plurality of devices, each device being enabled for operation in a receive and a transmit mode respectively in response to receive and transmit channel numbers from said communication multiplexer;

said communication multiplexer including polling means for sending a predetermined sequence of said receive channel numbers and said transmit channel numbers to said plurality of devices and receiving a request signal when one of said plurality of devices requests service by responding to said receive or transmit channel number;

said polling means including:

counter/register means for generating a first sequence of channel numbers during an initialization operation;

first multiplexer means in a first state coupled to said counter/register means for receiving each of said first sequence of channel numbers;

first in-first out (FIFO) means coupled for storing each of said first sequence of channel numbers;

said FIFO means being coupled to said counter/register means for recirculating said first sequence of channel numbers during a polling operation, said plurality of devices being coupled to said counter/register means and responsive to said recirculating receive and transmit channel numbers for generating said request signal when one of said plurality of channel numbers requesting service receives a preassigned channel number of said first sequence of channel numbers.

2. The system of claim 1 wherein said counter/register means is responsive to said request signal for storing said preassigned channel number;

said FIFO means being coupled to said first multiplexer means to recirculate the remaining of said first sequence of channel numbers for generating a second sequence of channel numbers for storage in said FIFO means;

wherein said first sequence of channel numbers is stored in said FIFO means with said receive channel numbers having a first priority and said transmit channel numbers having a second priority, wherein said second sequence of channel numbers is stored in said FIFO means and said preassigned channel number stored in said counter/register means, said preassigned channel number being one of said receive channel numbers and having said first priority, said receive channel numbers of said second sequence of channel numbers having said second priority and said transmit channel numbers of said second sequence of channel numbers having a third priority, and wherein said preassigned channel number being one of said transmit channel numbers and having said third priority, said receive channel numbers of said second sequence of channel numbers having said first priority and said transmit channel numbers of said second sequence of channel numbers having said second priority;

said polling means giving said first priority to the most recently used of said receive channel number and equal priority to said transmit channel numbers.

3. The system of claim 2 wherein said FIFO means comprises:

a first in-first out (FIFO) memory having a plurality of locations including an input and an output location for receiving and storing said receive and said transmit channel numbers in a predetermined order, and for transferring said receive and said transmit channel numbers in said predetermined order, said FIFO generating a first signal indicating that said input location is empty and a second signal indicating that said output location is full;

a second multiplexer coupled to receive said first and second signals during said initialization operation for generating a shift signal when said first signal indicates that said input location is empty, and generating said shift signal during said polling operation and when generating said second sequence of channel numbers when said first signal indicates that said input location is empty and said second signal indicates that said output location is full; and a shift pulse flop coupled to receive said shift signal for generating a shift pulse signal for receiving said channel numbers in said input location and transferring said channel numbers from said output location.

4. The system of claim 3 wherein said counter/register means comprises:

a counter/register coupled to said shift pulse flop and responsive to a sequence of said shift pulse signals for generating said first sequence of channel numbers during said initialization operation, and coupled for storing each of said first or said second sequence of channel numbers received from said output location of said FIFO during said polling operation for transfer to said plurality of devices;

said counter/register being responsive to said request signal for storing said preassigned channel number during the time said data byte is being transferred between said main memory and said one of said plurality of devices.

5. The system of claim 4 wherein said first multiplexer means comprises:

a first multiplexer in a first state coupled to said counter/register for receiving each of said first sequence of channel numbers for transfer to said input location of said FIFO during said initialization operation and said polling operation; and said first multiplexer in a second state coupled to said FIFO for receiving said channel numbers from said output location for transfer to said input location when generating said second sequence of channel numbers.

6. The system of claim 5 wherein said predetermined order is indicative of said FIFO receiving and storing said receive channel numbers followed by said transmit channel numbers.

7. The system of claim 6 wherein said counter/register storing one of said transmit channel numbers as said preassigned channel number being responsive to said shift pulse signal for transferring said one of said transmit channel numbers through said first multiplexer in said first state to said input location of said FIFO and transferring a first of said receive channel numbers stored in said output location to said counter/register for transfer to said plurality of devices during said polling operation.

8. The system of claim 7 wherein said counter/register storing one of said receive channel numbers as said preassigned channel number transferring said one of said receive channel numbers to said plurality of devices during said polling operation.

* * * * *